(12) United States Patent
Barzen et al.

(10) Patent No.: US 9,676,271 B1
(45) Date of Patent: Jun. 13, 2017

(54) VEHICLE COOLING ARRANGEMENT

(71) Applicant: AGCO INTERNATIONAL GmbH, Hesston, KS (US)

(72) Inventors: Alexander Barzen, Ettlingen (DE); Marco Opitz, Marktoberdorf (DE); Georg Jutz, Marktoberdorf (DE)

(73) Assignee: AGCO INTERNATIONAL GmbH, Neuhausen (CH)

( * ) Notice: Subject to any disclaimer, the term of this patent is extended or adjusted under 35 U.S.C. 154(b) by 0 days.

(21) Appl. No.: 15/349,132

(22) Filed: Nov. 11, 2016

Related U.S. Application Data

(63) Continuation of application No. 14/995,312, filed on Jan. 14, 2016.

(51) Int. Cl.
*B60K 11/08* (2006.01)

(52) U.S. Cl.
CPC .................................. *B60K 11/08* (2013.01)

(58) Field of Classification Search
CPC .......... B60K 11/00; B60K 11/02; B60K 11/08
See application file for complete search history.

(56) References Cited

U.S. PATENT DOCUMENTS

| | | |
|---|---|---|
| 2003/0015361 A1 | 1/2003 | Bland |
| 2003/0057005 A1 | 3/2003 | Nagai et al. |
| 2005/0211487 A1 | 9/2005 | Obe et al. |
| 2012/0261212 A1* | 10/2012 | Bonaiti .................... A62B 1/14 182/5 |

FOREIGN PATENT DOCUMENTS

| | | |
|---|---|---|
| GB | 990535 A | 4/1965 |
| GB | 2025520 A | 1/1980 |

OTHER PUBLICATIONS

European Patent Office, International Search Report for related International Patent Application No. PCT/EP2014/065619, mailed Oct. 18, 2014.

* cited by examiner

*Primary Examiner* — John Walters
*Assistant Examiner* — James Triggs

(57) ABSTRACT

A tractor has a front bonnet which houses an engine and a cooling arrangement, the cooling arrangement having a fan, a radiator, and a mounting plate. The bonnet has a hood and two opposing side parts. A grill is positioned at the front of the bonnet through which air passes and enters the cooling arrangement. An extended fan shroud has a lower part which extends from the bottom half of a fan ring in a forward direction and an upper part which extends rearwards from the upper half of the fan ring towards the radiator over the mounting plate. A flange extends from the lower part of the fan shroud diagonally along opposing sides of the upper part and across the upper part of the fan shroud. The flange has a sealing member. When the bonnet is closed and in contact with the sealing member, two air compartments are defined.

7 Claims, 8 Drawing Sheets

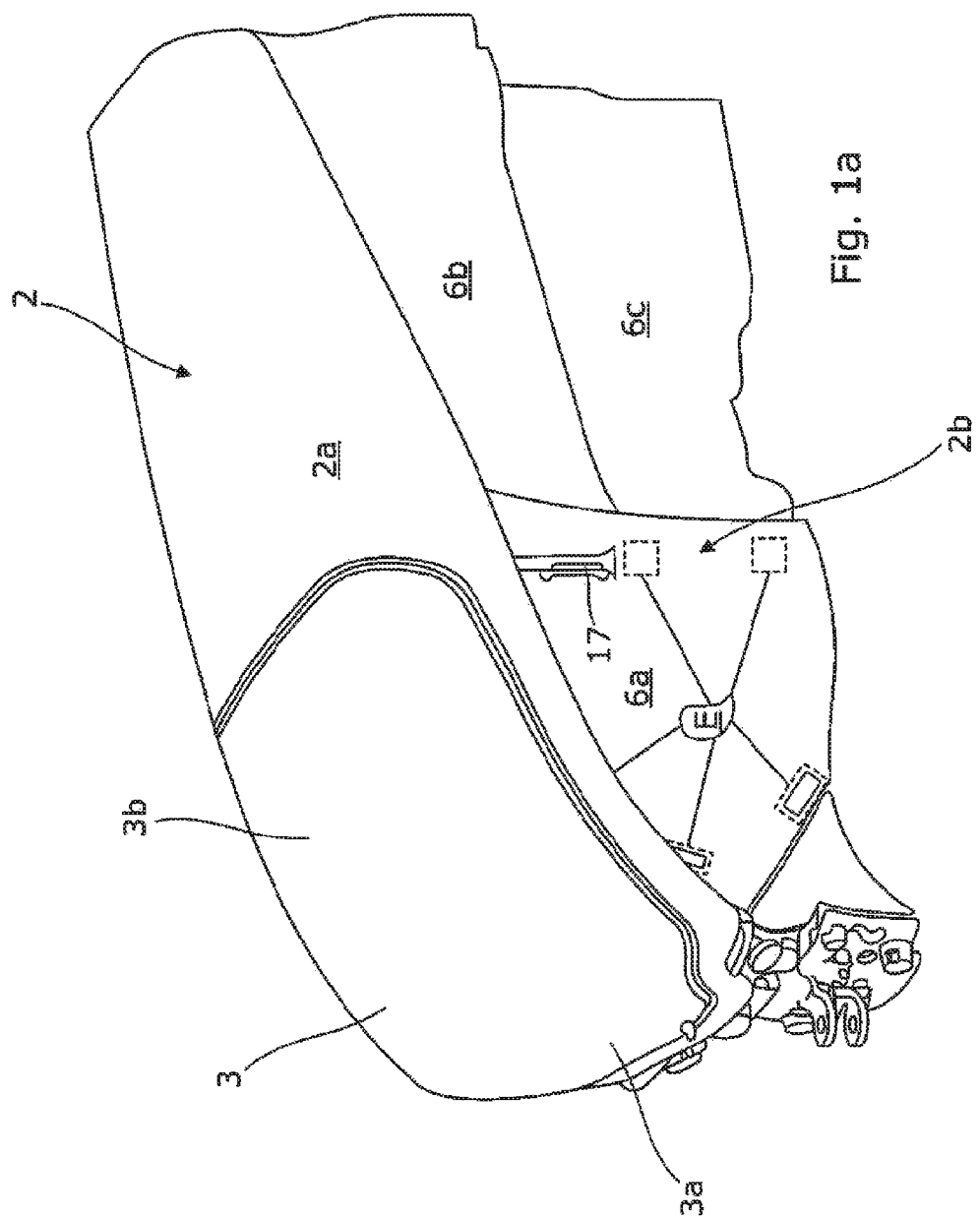

VEHICLE COOLING ARRANGEMENT

CROSS REFERENCE TO RELATED APPLICATIONS

This application is a continuation of U.S. application Ser. No. 14/995,312, filed Jan. 14, 2016, entitled "VEHICLE COOLING ARRANGEMENT".

BACKGROUND OF THE INVENTION

Field of Invention

This invention relates to a vehicle cooling system. More specifically, this invention relates to an air cooling arrangement on an agricultural vehicle.

Description of Related Art

Agricultural vehicles, such as agricultural tractors require a number of radiators in order to cool working media, such as a water cooler for the engine, a transmission oil cooler, a hydraulic oil cooler, an intercooler and possibly a condenser for an air-conditioning system. It is common practice to arrange the radiators in series one after the other under a bonnet of the vehicle so that air from a fan positioned at the front of the vehicle drives air through the series of radiators. Radiators in this arrangement, however can result in creating a high resistance to air flow. To overcome the resistance, a larger fan may be required. The radiator arrangement may also interrupt the air flow resulting in overheating of the radiator or radiators.

A tractor driver must be able to see the implements attached to the front of the vehicle from the driver' seat which means the front bonnet must not be too high or long. There is also a desire for the front wheels of the vehicle to be steered as tightly as possible. For the front wheels to be able to turned as far as possible, the bonnet of the vehicle, in which the radiator sub-assembly is arranged, must be kept as narrow and low as possible. The radiator sub-assembly is therefore subject to substantial restrictions with respect to its dimensions particularly in width and height. Since the heat sink of the radiators cannot therefore be substantially increased, dissipation of the resultant waste heat presents difficulties, particularly because of the trend to constantly increase the drive power of the vehicle. In order to obtain satisfactory heat dissipation, the radiators are usually arranged in as series at different heights.

It is known to fix radiators to a carrier plate which is mounted to the tractor chassis. EP1849684 discloses a carrier plate which is fitted directly in front of the engine on an approximately horizontal level between two longitudinal frames of the chassis in the front axle region of the vehicle. Radiators are arranged on the plate in a series with the radiator nearest the engine being mounted on a lowered step of the plate to enable a taller radiator to be mounted. Such an arrangement does not optimise the air flow through the radiators and may necessitate a larger fan to obtain the desired air flow.

BRIEF SUMMARY OF THE INVENTION

In one aspect of the invention, a tractor has a front bonnet which houses an engine and a cooling arrangement, the cooling arrangement having a fan, a radiator, and a mounting plate. The bonnet has a hood and two opposing side parts. A grill is positioned at the front of the bonnet through which air passes and enters the cooling arrangement. An extended fan shroud has a lower part which extends from the bottom half of a fan ring in a forward direction and an upper part which extends rearwards from the upper half of the fan ring towards the radiator over the mounting plate. A flange extends from the lower part of the fan shroud diagonally along opposing sides of the upper part and across the upper part of the fan shroud. The flange has a sealing member. When the bonnet is closed and in contact with the sealing member, two air compartments are defined.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE DRAWINGS

The invention will now be described, by way of example only, with reference to the following drawings in which:

FIG. 1a is a perspective view of the bonnet of FIG. 1;

DESCRIPTION OF EXAMPLE EMBODIMENTS

Figure 1:
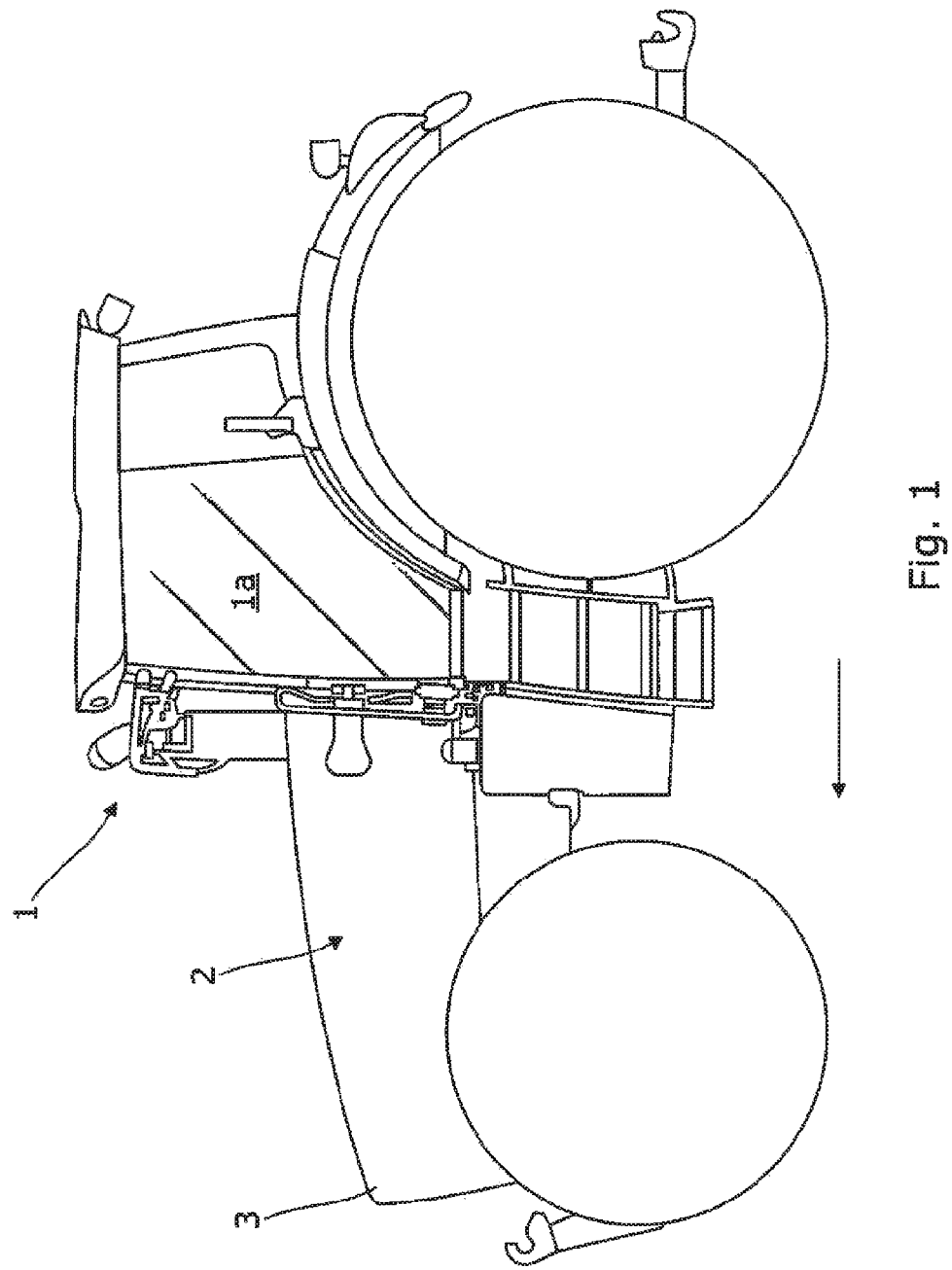
FIG. 1 is a side view of an agricultural tractor with the bonnet closed.

FIG. 1 is a side view of an agricultural tractor 1 having a front bonnet 2 which houses an engine and a cooling arrangement (not seen) in accordance with the invention. The bonnet 2 extends from a driver's cab 1a to the front of the tractor. A grill or mesh 3 is positioned at the front of the bonnet through which air passes and enters the cooling arrangement shown in FIGS. 2, 3 and 4. The arrow indicates the forward direction of travel.

FIG. 1a is a perspective view of the bonnet of FIG. 1. The bonnet 2 comprises a hood 2a and two opposing side parts 2b. When the bonnet 2 is closed as shown in FIGS. 1 and 1a, the hood 2a has a fairly flat upper surface which extends in a generally horizontal manner from the cab. Towards the front of the vehicle, the upper surface of the hood 2a starts to slope downwards and has an almost vertical front part at the front of the tractor. The hood 2a has an overhang which extends a small vertical distance along each of the two long opposing side edges. Each side of the bonnet 2 is formed from a side part 2b and the overhang of hood 2a. The front part of the hood 2a and a part of the upper surface of the hood is provided with the grill or mesh 3.

Figure 1B:
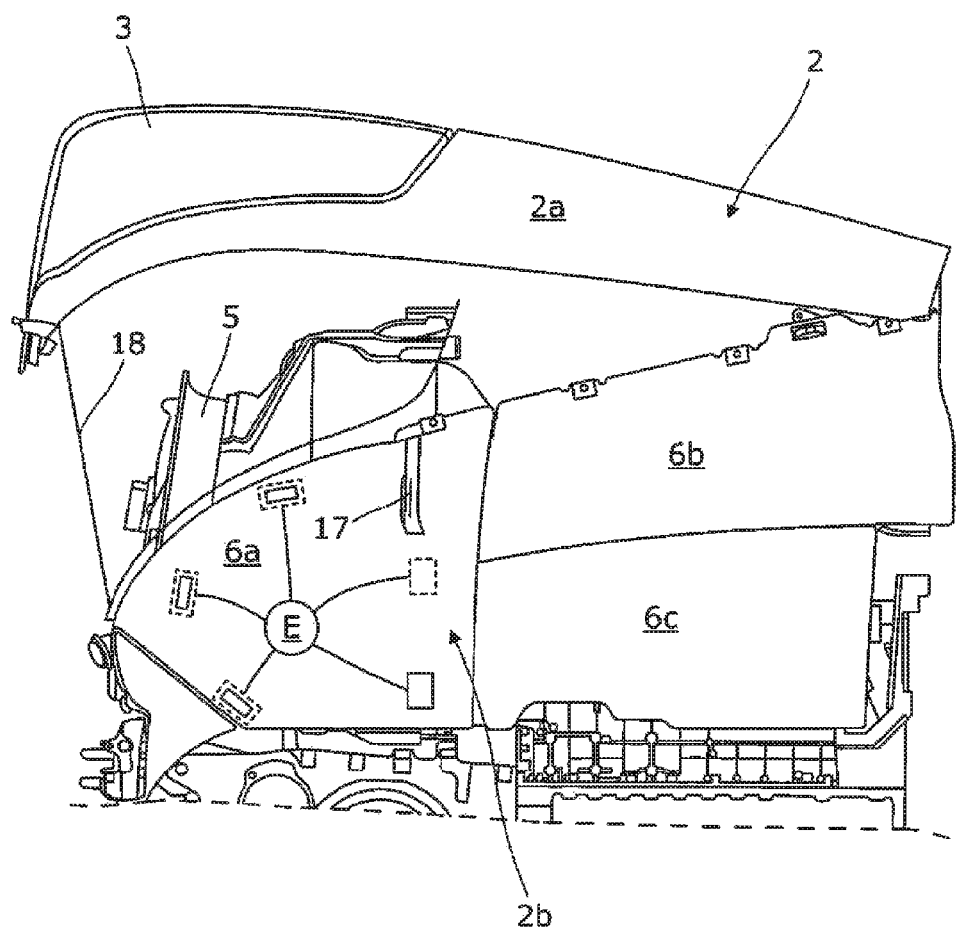
FIG. 1b is a side view of the bonnet of FIG. 1a with a hood of the bonnet raised in which a cooling arrangement in accordance with the invention is shown.

FIG. 1b is a side view of the bonnet 2 with the hood 2a in an open position. The hood 2a may be lifted to give access to the parts under it by pivoting it about a pivot axis located close to the cab 1*a*. When the hood 2*a* is lifted, it moves away from the side parts 2*b*. The larger the tractor, the higher is the front of the hood when pivoted open. In the open position, the hood is often too high for person to reach and then apply the necessary force to pivot it down to close it. The bonnet hood may be provided with a retractable belt 18 which extends between a spring mounted roller and an attaching means. Either one of the roller or attaching means is positioned on the hood 2*a* with the other part, attaching means or roller being positioned on the tractor, for example the chassis. When the hood 2*a* is open the belt extends vertically from the hood 2*a* to the chassis. To close the hood, the driver simply pulls a mid portion of the belt towards him or her which causes the hood to pivot downwards. As the hood 2*a* is closed, the belt retracts in length by the roller rolling the belt under tension from the roller spring.

Figure 6:
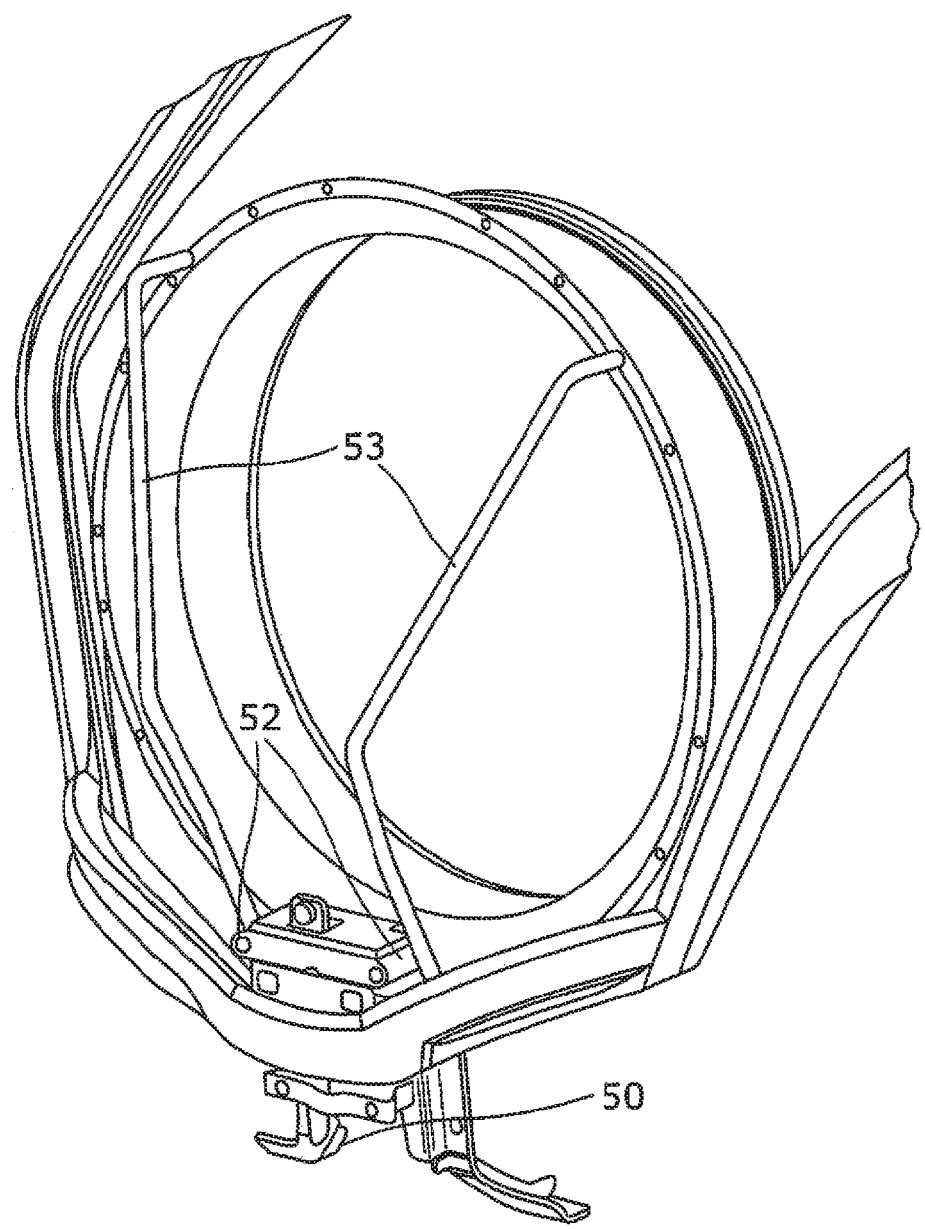
FIG. 6 shows a detailed view of the front of the vehicle of FIG. 4.

As shown in FIG. 6, the front of the hood is provided with a locking means 50 for securing the hood to a front part of the tractor in a closed position. Additionally, or alternatively for easy closure of the hood and to prevent damage to the hood, guidance means is provided comprising two rollers 52 and two tracks 53. In FIG. 6, the hood is provided with two rollers 52 either side of the locking means 50. Tracks 53 extend in a substantially upright manner from a front part of the tractor which enables the rollers 52 to roll between the tracks 53 and guide the locking means 50 to the front of the tractor for engagement as the hood is lowered.

Figure 3:
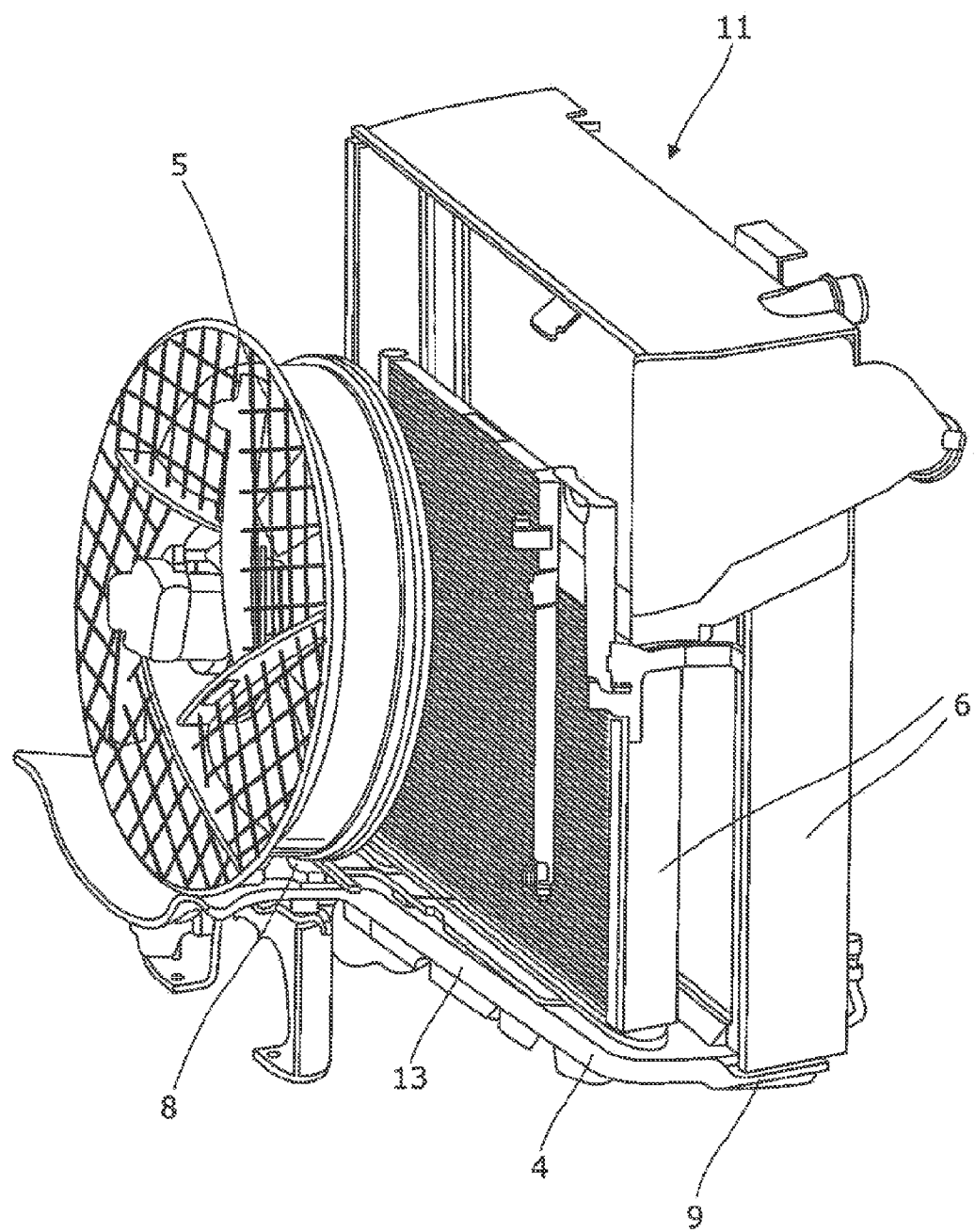
FIGS. 3 and 4 are perspective views of the cooling arrangement of FIG. 2 in which the bonnet panels and chassis are removed.

Each side part 2*b* comprises moveable side panels 6*a*, 6*b* and 6*c* (in which a grill may be integrated). Side panels 6*a* are located towards the front of the tractor and extend approximately from the fan 5 to radiators 6 as shown in FIG. 3. If more than one radiator 6 is fitted, the radiators are usually mounted in a series becoming increasingly closer towards the engine. Panels 6*b* and 6*c* are located towards the rear of the bonnet (that is in a direction towards the cab) and cover the engine. Moveable side panels 6*a* and 6*b* are pivotally attached to each side part 2*b* so that they can be moved with respect to the side parts to give access to components of the cooling system and/or engine system under the bonnet. The pivoting means may comprise spring means. Alternatively, side panels 6*a* and 6*b* may be fully, or partly removable from the side parts 2*b* to give access.

The edges of the panels 6*a* and 6*b* or the edges of the side parts 2*b* into which panels 6*a* and 6*b* fit are provided with a sealing means such as a rubber tubing 14 (FIG. 2) to prevent the escape of air to the atmosphere.

If side panel 6*a* is removable, it is attached to side part 2*b* by clamps and hooks at the locations marked E in FIGS. 1*a* and 1*b*. To enable the side panels 6*a* to be easily removed, a hand grip 17 can be provided on the side panels 6*a* which allows a person to easily get a grip of the panels.

Figure 2:
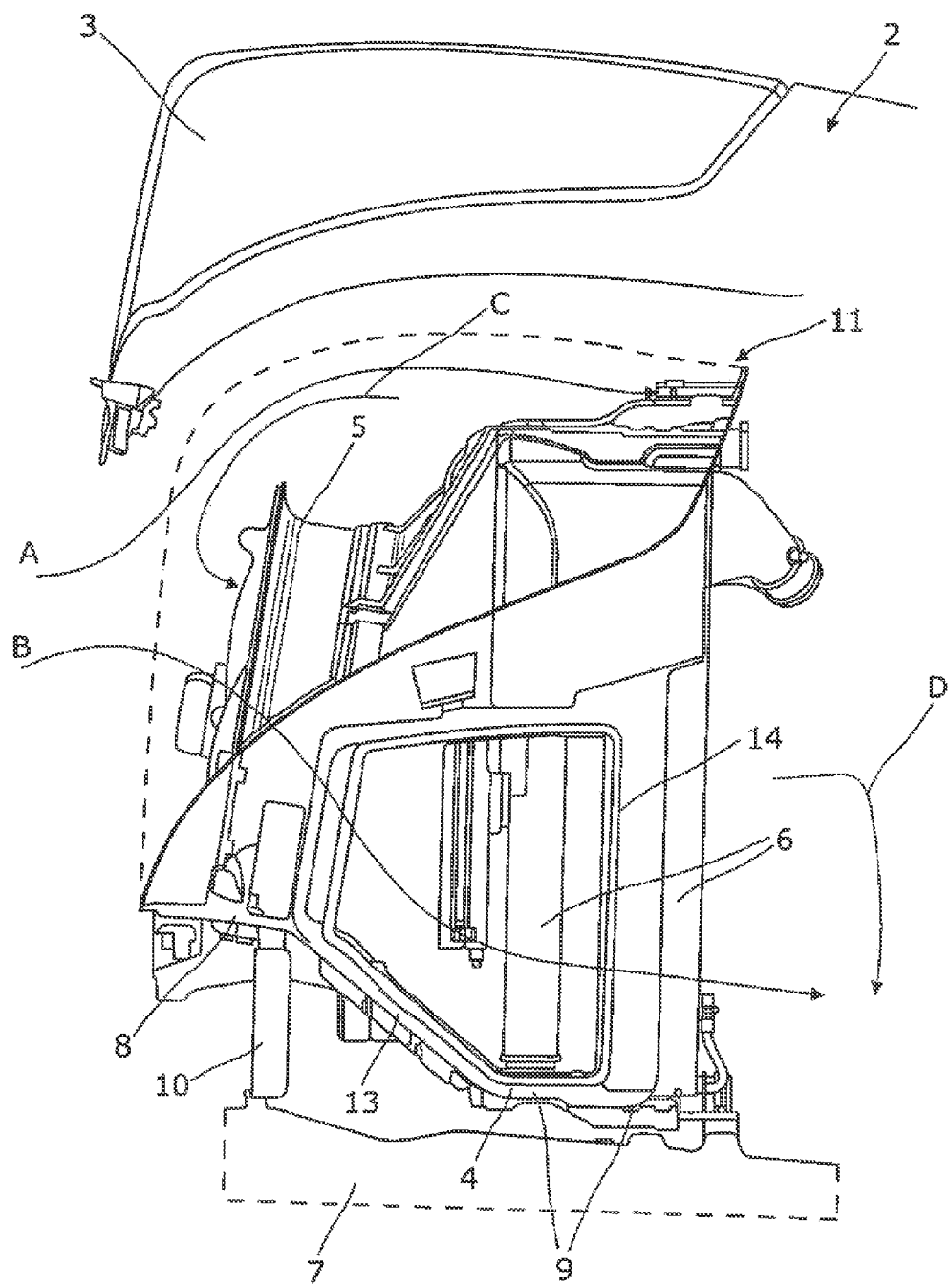
FIG. 2 is a side view of a front part of the tractor bonnet of FIG. 1b.

FIG. 2 is a side view of a front part of the bonnet 2 in which the side panel 6*a* has been omitted so that the cooling arrangement inside the bonnet can be seen. A mounting plate 4 is provided which extends from under the fan 5 which is positioned at the front of the tractor behind the grill 3 to under the radiator or radiators 6 which are positioned in front of the engine (not shown) with respect to the forward direction of travel of the tractor. The tractor is provided with two parallel frames 7 which form the chassis. The mounting plate 4 extends widthways across both frames 7 and is provided with a fan mounting surface 8 and radiator mounting surfaces 9. The side profile of the mounting plate 4 is that of a laterally extended Z in that the fan mounting surface 8 and radiator mounting surfaces 9 are generally horizontal and are connected by a sloping surface 13 such that the fan mounting surface is elevated with respect to the radiator mounting surfaces. Since the frames 7 are horizontal, a support element 10 fixes the front of the plate 4 under the fan mounting surface 8 to the frames 7. The support element 10 is affixed to the frames 7 by bolts. The radiator mounting surface 9 of the plate is secured directly to the frames 7 by bolt means. On the underside of the plate 4 at the area of the fan mounting surface 8, attachment means are provided for attaching a light or heater core thereto. In, or on the plate 4 at the area of the radiator mounting surface 9, bore holes and/or channels may be provided for receiving pipes from the radiator, or radiators 6 and/or for delivering liquid to the radiator or radiators 6.

Two air flows are indicated by arrows A and B. Air Arrow A shows an air flow for an air intake for the combustion of the engine and arrow B for cooling the radiators 6 and the engine. The fan 5 pushes air through the radiators 6 and the engine.

Figure 4:
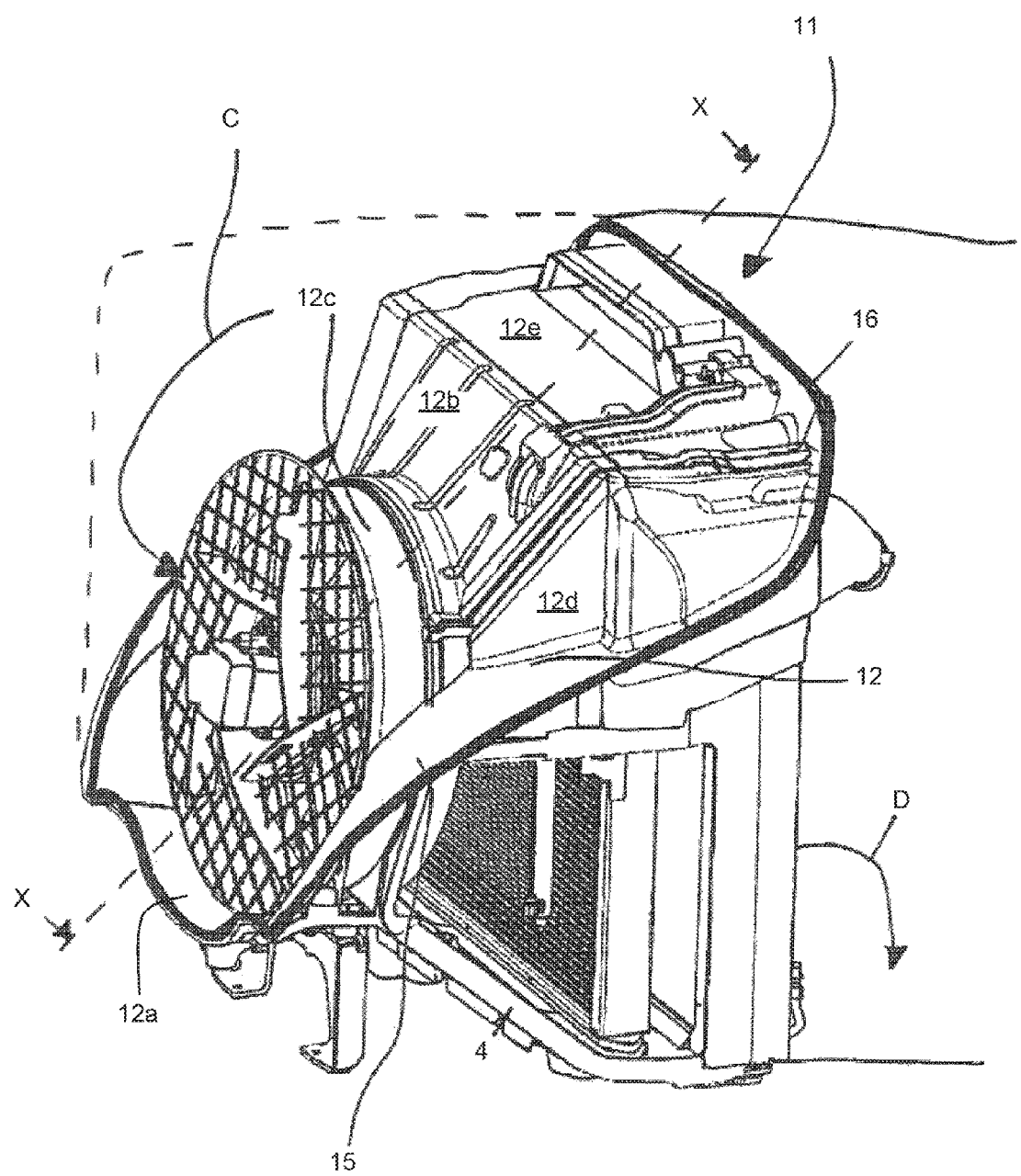

FIGS. 3 and 4 are perspective views of the cooling arrangement 11 in which the chassis and bonnet have been omitted. The difference between FIGS. 3 and 4 is that in FIG. 4 an extended fan shroud 12 is shown. As shown in FIGS. 3 and 4 fan 5 is mounted on mounting plate 4 so that it is tilted towards the radiators 6. Fan 5 is secured to the fan mounting surface 8 by fan attachment means extending through bores in the plate 4. Radiators 6 are attached in series to plate 4 by bolt means. The radiators 6 are in a spaced arrangement from the fan 5 with the fan mounting surface 8 at one end of the sloping surface 13 and the radiator mounting surfaces 9 at the other end.

The extended fan shroud is assembled from a number of parts bolted together. Preferably, the extended shroud comprises at least three or four parts. In FIG. 4 the extended fan shroud 12 is shown having a lower part 12*a* which extends from the bottom half of a fan ring 12*c* in a forward direction with respect to the forward direction of travel of the tractor and an upper part 12*b* which extends rearwards from the upper half of the fan ring 12*c* towards the radiators 6 over plate 4. The upper part 12*b* is formed by two side parts 12*d* (only one is shown in FIG. 4) and a central part 12*e*. Side parts 12*d* may therefore be connected to either side of central part 12*e* to from an upper part 12*b*. Alternatively, central part 12*e* could itself comprise two half parts, each of which is connected to a side part 12*e* to form the upper part 12*b*

A flange 15 is provided with sealing means 16. The flange 15 extends from a lower part of the fan shroud 12*a* diagonally along opposing sides of the upper part 12*b* and across parts 12*b* and 12*d* of upper part 12*b*. Preferably the bonnet 2 may be provided with sealing means 16. Sealing means 16 may, for example comprise rubber tubing.

Figure 5:
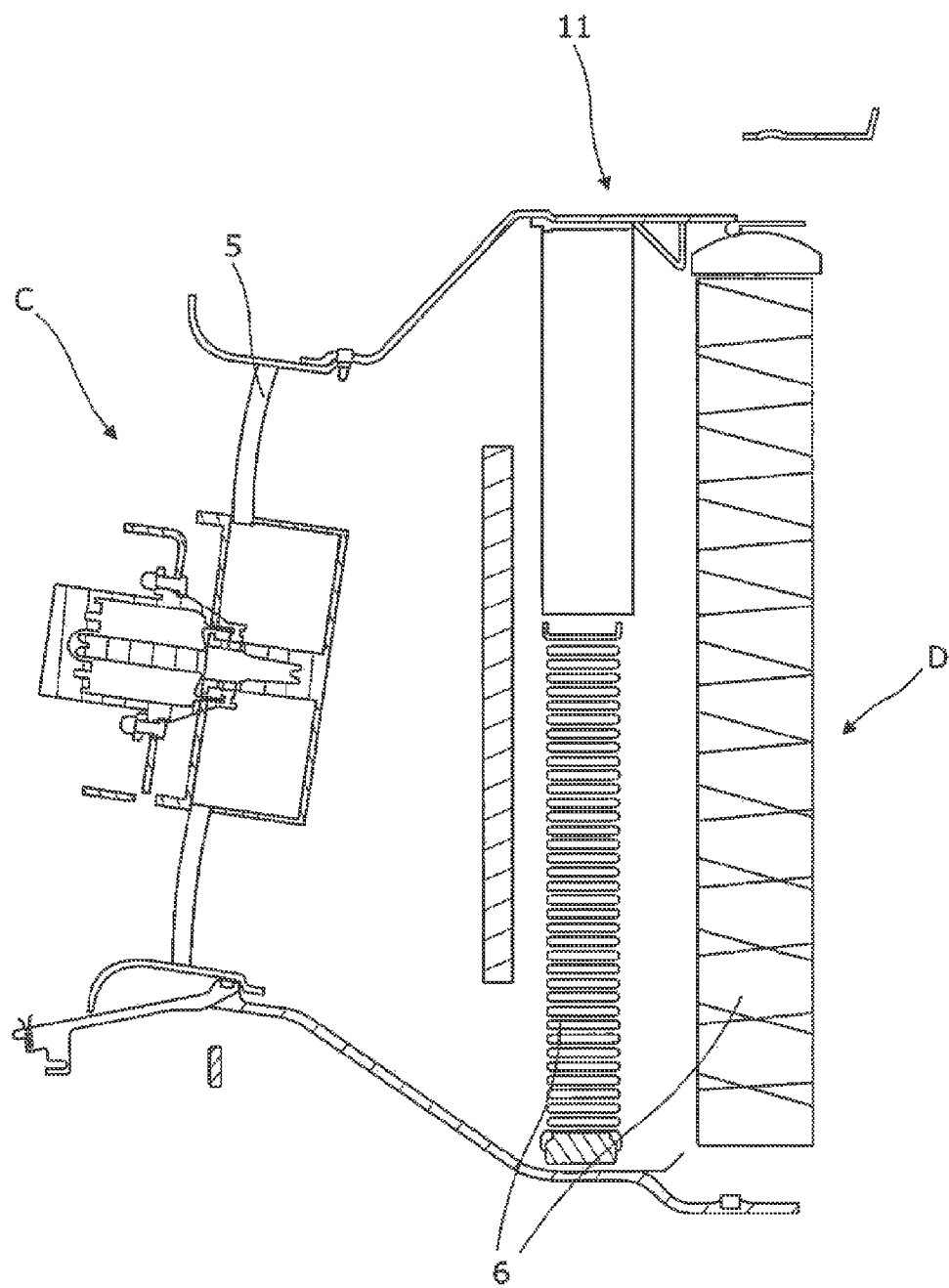
FIG. 5 shows a cross section along line X-X of FIG. 4 which shows the cooling arrangement.

In FIG. 5 the cooling arrangement 11 is shown. The cooling arrangement shown comprises a fan 5 and radiators 6 in which the radiators are located downstream of the fan. It is envisaged that the fan 5 and the radiators 6 could be arranged the other way around so that the radiators are mounted upstream of the fan. In such an arrangement, the radiators are mounted in front of the fan with respect to the forward direction of travel.

When the bonnet 2 is closed and in contact with the sealing means 16 two air compartments are defined. A first air compartment C and a second air compartment D. First air compartment C is partially positioned above cooling fan 5, between the grill 3 of hood 2*a* and extended fan shroud 12. Compartment C is a low pressure area. The dotted line in FIGS. 2 and 4 represents the grill 3 of the bonnet 2 when closed. With reference to FIG. 1*a* in which the bonnet is closed, grill 3 is formed in the hood 2*a* so that it has a vertical, or generally vertical part 3a and a generally horizontal part 3b. Grill part 3b extends from grill part 3a towards the rear of the vehicle past fan 5.

Second air compartment D is positioned downstream of the fan 5 and as shown herein is located behind the radiators 6. Compartment D is a high pressure area and is enclosed by the hood 2a, the flange 15 and bonnet side panels 6b, 6c. Air which passes through the radiators 6 enters compartment D and then flows out to the atmosphere through a grill mounted in panel 6c, or through the frames 7.

By compartment it is meant a partially or fully enclosed area in which the surface fully or partially enclosing the area may, or may not be airtight.

When the bonnet 2 is closed and sealed, the panels 6a form an extension of the fan shroud between lower part 12a and upper part 12b so that air is channeled between the upper part 12b, side panels 6a and mounting plate 4 to the radiator 6. As a result, a complete fan shroud which extends from the fan to the radiator is formed from the upper part 12b, side panels 6a and plate 4. Thereby the mounting plate 4 guides air directly to the radiators 6.

When the bonnet 2 is closed and the sealing means 16 contacts the bonnet 2 (or flange) two air compartments C and D are defined.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. An agricultural tractor comprising:
   a front bonnet which houses an engine and a cooling arrangement, the cooling arrangement comprising a fan, at least one radiator, and a mounting plate, wherein the bonnet comprises a hood and two opposing side parts;
   a grill or mesh positioned at the front of the bonnet through which air passes and enters the cooling arrangement; and
   an extended fan shroud having a lower part which extends from the bottom half of a fan ring in a forward direction with respect to the forward direction of travel of the tractor and an upper part which extends rearwards from the upper half of the fan ring towards the at least one radiator over the mounting plate, wherein a flange extends from the lower part of the fan shroud diagonally along opposing sides of the upper part of the fan shroud and across the upper part of the fan shroud, wherein the flange is provided with sealing member, and wherein when the bonnet is closed and in contact with the sealing member, two air compartments are defined.

2. The agricultural tractor of claim 1, wherein when the bonnet is closed the grill is formed in the hood so that it has a generally vertical part and a generally horizontal part, the generally horizontal grill part extending from the generally vertical grill part towards the rear of the vehicle past the fan.

3. The agricultural tractor of claim 1, wherein when the bonnet is closed and in contact with the sealing member, a first air compartment and a second air compartment are defined, wherein
   the first air compartment is partially positioned above the cooling fan, between the grill of the hood and the extended fan shroud, and
   the second air compartment is positioned behind the radiator, and is enclosed by the hood, the flange and the bonnet side panels.

4. The agricultural tractor of claim 1, wherein when the bonnet is closed the first air compartment is a low pressure area and the second air compartment is a high pressure area.

5. The agricultural tractor of claim 1, wherein the mounting plate provides an air guidance means for guiding air from the fan to the radiator, as well as providing a mounting surface for mounting the fan and a radiator to the vehicle.

6. The agricultural tractor of claim 1, wherein the extended fan shroud is assembled from a number of parts bolted together.

7. The agricultural tractor of claim 1, wherein the fan is mounted on mounting plate so that it is tilted towards the radiator.

* * * * *